J. MOORCROFT.
NUT LOCK.

No. 107,704. Patented Sept. 27, 1870.

United States Patent Office.

JAMES MOORCROFT, OF NEWPORT, RHODE ISLAND.

Letters Patent No. 107,704, dated September 27, 1870.

IMPROVEMENT IN NUT-LOCKS.

The Schedule referred to in these Letters Patent and making part of the same

*To all whom it may concern:*

Be it known that I, JAMES MOORCROFT, of Newport, in the county of Newport and State of Rhode Island, have invented a new and improved Lock-Nut; and I do hereby declare that the following is a full, clear, and exact description thereof, which will enable others skilled in the art to make and use the same, reference being had to the accompanying drawing forming part of this specification, in which—

Similar letters of reference indicate corresponding parts.

This invention relates to a new manner of locking a nut by applying it to the split end of a bolt, together with a conical screw, for expanding said bolt within the nut. Thereby the nut will be securely fastened.

Figure 1:
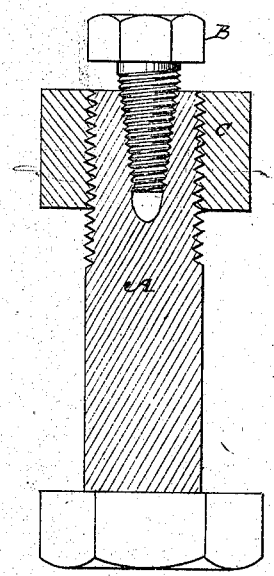
Figure 1 represents a sectional side view of a bolt provided with my improved lock-nut.
Figure 2:
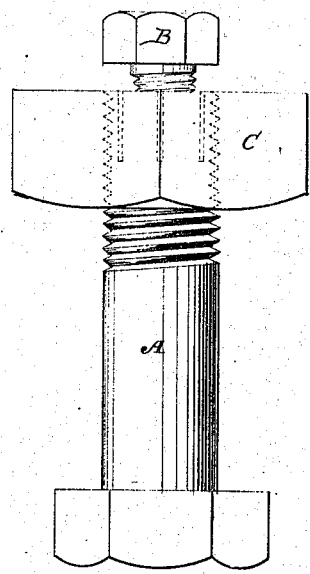
Figure 2 is a side view of the same.

A in the drawing represents a bolt, of suitable size. Its threaded end is split, as indicated by dotted lines in fig. 2, so as to be expansible, the incision extending down far enough to impart elasticity to the pieces between them.

The split end of the bolt is tapped, and provided with a female screw-thread, for receiving a conical screw, B.

After the nut C has been applied to the bolt, the screw B is put in and turned down, so as to expand the split end of the bolt, and spread the same firmly against the nut. The bolt, beyond the nut, will thereby be so much enlarged that the nut cannot work off, while the screw B is retained by the powerful spring-pressure of the arms that are formed by the splitting of the bolt.

Having thus described my invention,

I claim as new and desire to secure by Letters Patent—

The split bolt A, combined with the conical screw B, for the purpose of locking the nut C, substantially as herein shown and described.

JAMES MOORCROFT.

Witnesses:
THOS. BURLINGHAM,
ALLEN O. SLADE.